June 13, 1961 H. S. KATZENSTEIN 2,988,654

ELECTRIC GENERATOR

Filed Sept. 4, 1958 2 Sheets-Sheet 1

INVENTOR.

HENRY S. KATZENSTEIN

BY Darby + Darby

ATTORNEYS

INVENTOR.
HENRY S. KATZENSTEIN
BY Darby + Darby
ATTORNEYS 2,988,654
Patented June 13, 1961

2,988,654

ELECTRIC GENERATOR

Henry S. Katzenstein, Leonia, N.J., assignor to The Siegler Corporation, Long Island City, N.Y., a corporation of Delaware Filed Sept. 4, 1958, Ser. No. 758,947
3 Claims. (Cl. 307—88.5)

This invention comprises a circuit combination for generating electric current, and more specifically, polyphase alternating currents having precise time separation.

One object of this invention is to provide a novel transistor circuit combination for generating three-phase alternating currents from a static single phase source.

Another object of this invention is to provide an alternating current source of three-phase output having a very exact phase separation of 120 degrees.

Still another object of the invention is to provide a circuit of this type which is not sensitive to temperature changes, and is satisfactorily operative over a wider voltage range than is possible with other types of circuits of general similarity.

An important object of this invention is to provide an alternating current generator which upon starting up always operates in the same mode.

Still another object of the invention is to provide a so-called "ratchet" type of circuit generation in which the circuit is inherently positively locked for operation in the same mode.

An important object of this invention is to provide circuits of this kind which are considerably simpler in component makeup than generally similar circuits using vacuum tubes.

Other and more detailed objects of the invention will be apparent from the following description of the embodiment thereof illustrated in the attached drawings and described hereinafter.

An important object of this invention is to provide a three-phase alternating current generator operating from a direct current potential source which is extremely stable in operation in that it cannot restart in an improper mode. In a broad sense this circuit is similar to previously known decade ring circuits in which those described in the "Review of Scientific Instruments" by V. H. Regener 17, 185 (1946), and Leo Seren 18, 654 (1947) are examples. The circuits therein disclosed consist of arrays of ten pentode trigger pairs arranged so that an input pulse causes a transition between each of the ten stable states in a predetermined succession. Such circuits have use as counting circuits but have not found extensive application because better cycles-of-ten have been developed using binary counting circuits with feedback. As recognized in the above mentioned articles, these circuits are erratic in that they may start up in various modes unless extensive and complicated precautions are taken, which are not always effective to insure starting in a proper mode and sequence. The failure of such circuits to have precise restarting conditions makes their behaviour erratic, and as a result they have found little practical use.

As will appear hereinafter, the circuits herein disclosed distinguish in many respects from those of the prior art in which those mentioned above are examples. Very importantly, the circuit of this invention is arranged to generate polyphase currents.

Figure 1:
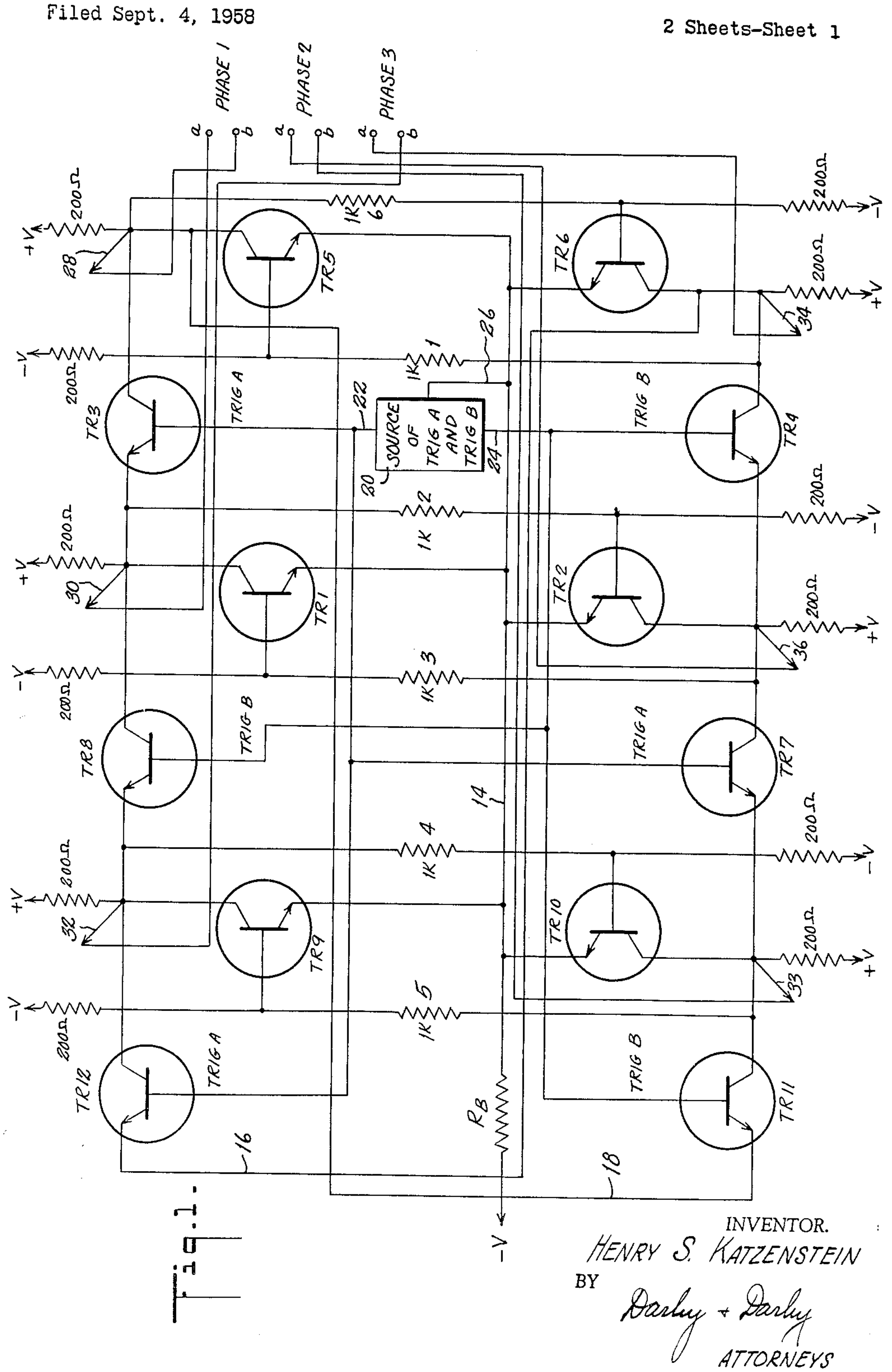
FIGURE 1 is a diagrammatic illustration of the circuit of this invention.

The circuit illustrated in FIG. 1 consists of three transistor pairs TR1, TR2; TR5, TR6; and TR9, TR10. They are connected in a circuit as illustrated in which the transistor pairs are coupled by means of the transistors TR3, TR4, TR7, TR8, TR11 and TR12 in such a manner to insure that the stepping signals from a suitable trigger source produce the required succession of operations in thte best mode to result in a polyphase output.

Figures 2, 3, 4:
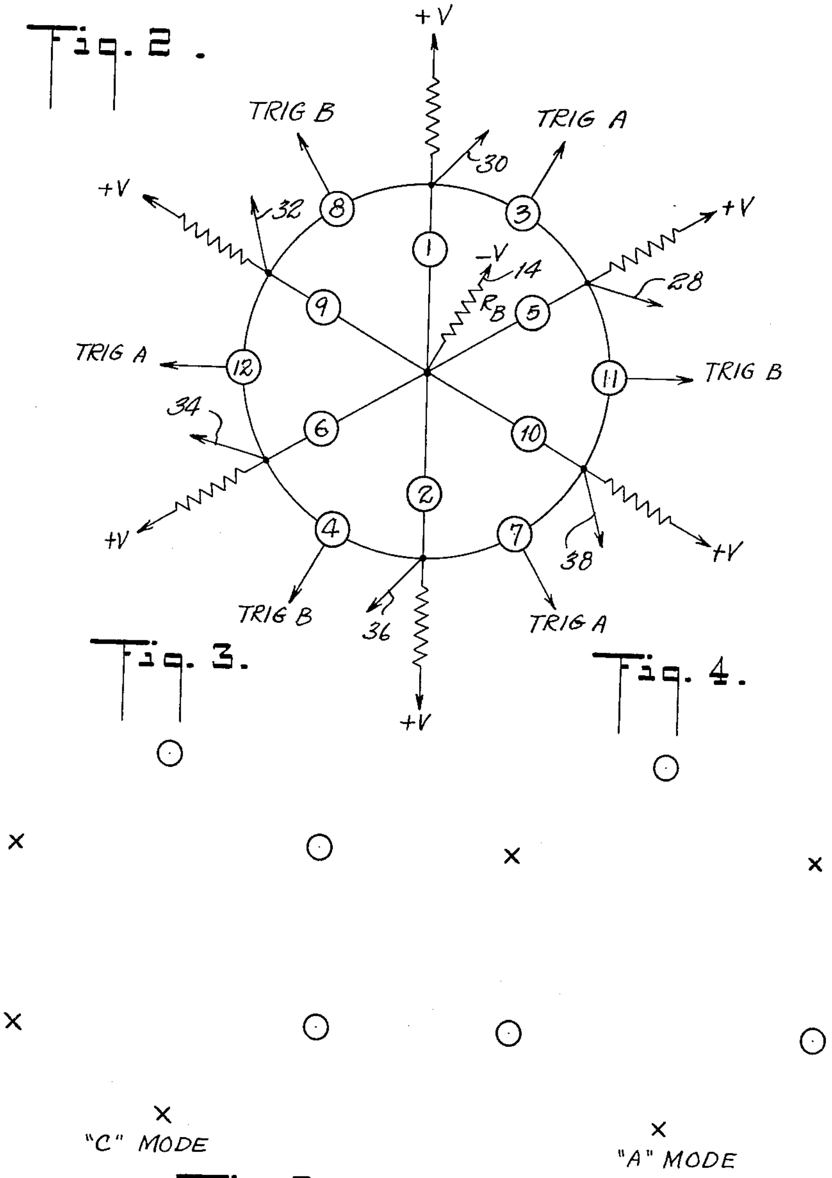
FIGURE 2 is a simplified representation of the circuit of FIG. 1, illustrating the ring formation characteristic thereof.
FIGURE 3 is a diagrammatic illustration of the inherent mode of operation of the circuit.
FIGURE 4 is a diagrammatic illustration of another possible mode of operation which is automatically avoided as an inherent characteristic of this invention.

As illustrated in FIG. 1, the collectors and emitters of the coupling transistors are successively connected in series in a manner to form a ring circuit diagrammatically illustrated in FIG. 2. It will be noted that the emitter of TR12 is connected by the line 16 to the collector of TR6 and the emitter of TR11 is connected by the line 18 to the collector of TR6. This provides a ring circuit as illustrated in FIG. 2. In analyzing the circuit of FIG. 1, it will be helpful to imagine that the portion of the circle below the negative side of the input circuit comprising the line 14 is turned over and then moved up in alignment with the righthand end of the upper part of the circuit, so that TR11 for example, would lie along an extension of the line which includes TR12, TR8 and TR3. If this circuit is then imagined to be bent into a circle so that the collector of TR4 is connected to the emitter of TR12, the ring formation will become apparent. The fact of the matter is, of course, that a ring circuit is shown because the collector of TR6 is connected to the emitter of TR12 by the line 16 and similarly the collector of TR5 is connected to the emitter of TR11 by the line 18.

As clearly shown in FIG. 1, the base of each transistor of the trigger pairs is cross-connected to the collector of the other of the pair through the base resistors 1K1, 1K2, 1K3, 1K4 and 1K6. In addition the collector of each of the trigger resistors of each of the trigger pairs is connected to the positive side of a suitable direct current voltage source, each through a resistor which has been indicated in the drawings as having the value of 200 ohms. In the particular circuit illustrated the 1K resistors each have a value of 1000 ohms. The negative side of this same source is connected as shown likewise in each case through a 200 ohm resistor to a point between the base of the trigger transistors and the 1K resistor which connects that base with the collector of the related coupling transistor. It is also noted that the common negative lead for the emitters of the trigger transistors includes the resistor $R_B$.

At 20 is diagrammatically illustrated a source of trigger pulses which have been designated TRIG A and TRIG B. As will appear later, the operation of this circuit requires that trigger pulses A and B alternate to insure that operation of the system advances around the ring one step for each triggering action. This can be accomplished by shaping the triggering pulses but the alternate trigger line scheme herein disclosed is more positive and certain in its stepping action. The required triggering pulses, as will be readily apparent to those skilled in the art, are easily derived from standard flip-flop circuits driven at the desired trigger frequency with two trigger outputs derived from the two collectors of the flip-flop circuit. The switching point of the square wave pulses is synchronized with the output of an oscillator operating at the sixth harmonic of the desired output frequency. This insures rigorous phase separation and a desired on-off ratio is maintained. Thus the diagrammatic illustration of the source 20 represents in combination a standard flip-flop transistor circuit controlled by an oscillator of any suitable form, in which combination the flip-flop circuit is under the control of the sixth harmonic of the output frequency of the oscillator. The output of the source 20 for A triggering pulses is connected by the line 22 to the bases of the coupling transistors TR3, TR7 and TR12, as illustrated. Correspondingly, the B triggering pulses are applied through the connection 24 to the bases of the coupling transistors TR4, TR8 and TR11, as shown. The other side of the circuit for the source 20 is connected to line 14, as illustrated at 26.

The output connections for the circuit, in which the three-phase output appears, are provided by the leads 28, 30, 32, 34, 36, and 38, which can be used individually or in various combinations, depending upon the nature and use to which the three-phase current generated by this circuit is to be put.

Figure 5:
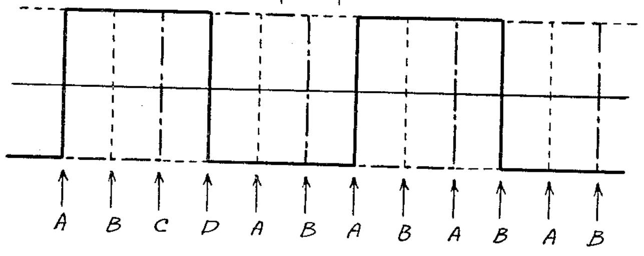
FIGURE 5 is a diagrammatic illustration of the characteristic three-phase output of the circuit.

As illustrated in FIG. 5, the circuit of this invention generates three-phase signals having square wave formation and the pulses or half cycles of each of the three waves are initiated at the time of triggering as illustrated by the arrows in FIG. 5 representative of the trigger pulses A and B. The signals depicted in FIG. 5 are those which comprise the outputs indicated as phase 1, phase 2 and phase 3 in FIG 1.

As a result of the cross-connected collector to base resistors 1K, only three of the six transistors in the trigger circuits, that is transistors TR1, TR2, TR5, TR6, TR9 and TR10, can be conducting since if TR1 is conducting, TR2 is nonconducting and so forth. First of all it should be noted that there are only two types of operating configurations that can result, that is mode A and mode C, as illustrated in FIGS. 3 and 4 respectively. The C mode of operation is the consecutive mode, which the A mode is the alternating mode. As those skilled in the art will understand the A mode has only two stable states and is not useful. On the other band, the C mode has six distinct states corresponding to the clockwise rotation of the figure of FIG. 3 in steps of 60 degrees about its center. The coupling transistors which connect between the collectors of the trigger transistors act to commutate the circuit in the C mode through its six possible states.

If it be assumed with reference to FIG. 2 that the conducting transistors are TR1, TR9 and TR6, then TR2, TR10 and TR5 are nonconducting. It follows that the only coupling transistor which has its collector positive with respect to its emitter is TR3, since it is connected between the collectors of the conducting transistors TR1 and the nonconducting transistor TR5. It will be noted that TR4 is in a related condition, but the potential is reversed so that its collector is negative with respect to its emitter. To visually indicate the situation with regard to TR3, the following table will be helpful. In this table the prefix TR will be left off of all the numbers as a simplification. Thus the situation is:

```
1-C      5-N
      3 ------ TRIG A
2-N      6-C
      4
```

The "C," of course, indicates conducting in the above table, and the "N," nonconducting.

If, now, a positive going potential is applied to the terminal marked TRIG A of the transistor TR3, its base will draw current from the trigger source 20 and the collector of transistor 8TR5 drops to a low potential due to current drawn by transistor TR3 through its collector resistor from the direct current source indicated by +V. This triggers the trigger pair comprising transistors TR5 and TR6 into the state where TR6 is nonconducting, and TR5 is conducting. As a result the transistor group TR1, TR9 and TR6 which was conducting changes to the transistor group TR1, TR9 and TR5, leaving TR2, TR10 and TR6 nonconducting. By reference to FIG. 2 it will be seen that the conducting group has advanced one step in a clockwise direction, resulting in the following condition as represented by a table corresponding to that above.

```
5-C        10-N
      11 -------- TRIG B
6-N        - 9-C
      12
```

Under these conditions TR11 draws current from the source, with the result that TR10 becomes conducting and TR9 becomes nonconducting when the positive going trigger pulse B is applied to TR11. As the result of this change of conditions, the conducting group becomes TR1, TR5 and TR10. Thus again the conducting transistor group has advanced one step in a clockwise direction with reference to FIG. 2. It is apparent that each operational step corresponds to 60 degrees of rotation in a clockwise direction in FIG. 2.

Similar operations continue until a complete revolution is made with the trigger pulses A and B alternating and the conducting group of transistors advancing in a clockwise direction with a nonconducting group trailing them in the same sequence. The corresponding tables for these subsequent conditions are as follows:

```
10-C   -  2-N
      7 ------- TRIG A
 9-N   -  1-C
      8

 2-C      6-N
      4 ------- TRIG B
 1-N      5-C
      3

 6-C      9-N
     12 ------- TRIG A
 5-N     10-C
    11

 9-C    - 1-9
      8 ------- TRIG B
10-N    - 2-C
      7
```

Returning now to the first operation involving transistor TR3, it is apparent that an output pulse will appear across the circuit wires 30 and 14, as represented by the solid line in FIG. 5, for the first trigger pulse A, and its output wave will return to the starting point on the second trigger pulse B. The second output pulse will begin on the first trigger pulse B of FIG. 5 and will return to starting position, as shown by the short dash line, upon the third trigger pulse A. Likewise, the third output pulse will start upon the second trigger pulse A and terminate on the third trigger pulse B, completing one three-phase cycle of output. The respective phases appear across related output terminals 30, 28, 38, 36, 34 and 32. It will be noted, as is apparent from the circuit arrangement, and as indicated in FIG. 5, that each of the output waves will have a square shape and they will be rigorously separated in time respectively by 120 degrees.

The positive "ratchet" action of the circuit is insured by the use of the alternate, independent trigger pulses A and B supplied by the source 20.

Operation of the circuit in the C mode as distinguished from the A mode is prevented by the leakage currents which inherently flow through the coupling transistors TR3, TR4, TR7, TR8, TR11 and TR12. In an A mode of operation each "on" transistor is adjacent to an "off" transistor on each side, and vice versa. Thus, the leakage between adjacent transistors tends to turn over the least symmetrical trigger pair, and positively cause transistion to the desired C mode. In practice this happens at each turn-on of the circuit, and no inherent condition in the circuit can result in an A mode of operation.

While the specific embodiment of the invention selected herein for illustrative purposes is adapted to the generation of three-phase current, it is obvious that any reasonable number of polyphase signals can be generated by using more or less trigger pairs, that is by multiplying the transistor pair combination which is the basic element of this circuit.

An important feature of this circuit is its independence of voltage variation within reason. It will work efficiently in the potential range for —V to +V of 5 to 30 volts, using NPN switching transistors of which Sylvania No. 1107 is an example.

In view of the above description it will be apparent to those skilled in the art that the novel subject matter herein disclosed may be embodied in other circuits comparable to that disclosed herein, which may differ therefrom only in detail, which variants, however, are considered to be within the scope of this invention as determined by the appended claims.

What is claimed is:

1. A polyphase electric current generator comprising a plurality of semiconductor coupling devices, means for connecting said coupling devices to form a closed ring circuit, a plurality of pairs of semiconductor trigger devices, means for connecting each pair to operate as a switching device having two states of operation in which alternate ones of the semiconductors of a respective pair is conducting and nonconducting, means for connecting one of the semiconductors in each trigger pair to the closed ring circuit formed by said coupling semiconductors, means for producing periodic first and second trigger signals which occur in a consecutive sequence, means for applying said first trigger signals to alternate ones of the semiconductor coupling devices and said second trigger signals to the others of said coupling devices, the application of each trigger pulse causing only one of said trigger pairs to switch its operating state.

2. A polyphase signal generator comprising a plurality of coupling transistors, each of said coupling transistors having respective collector, base and emitter electrodes, means for serially connecting the collector electrode of one coupling transistor to the emitter electrode of another coupling transistor to form a closed ring circuit, a plurality of pairs of trigger transistors having two states of operation in which alternate ones of said transistors in a pair are conducting and nonconducting, each transistor of said trigger pair having a respective output electrode, means for connecting the output electrode of each transistor of a trigger pair to a collector-emitter junction of said coupling transistors at diametrically opposite points on the ring circuit, means for successively applying trigger signals to the base electrodes of alternate ones of said coupling transistors, each successive trigger signal causing one of said trigger pairs to change its operating state.

3. A polyphase signal generator comprising a plurality of coupling transistors, each of said coupling transistors having respective collector, base and emitter electrodes, means for serially connecting the collector electrode of one coupling transistor to the emitter electrode of another coupling transistor to form a closed ring circuit, a plurality of pairs of trigger transistors having two states of operation in which alternate ones of said transistors in a pair are conducting and nonconducting, each transistor of said trigger pair having a respective output electrode and means for connecting the output electrode of each transistor of a trigger pair to a collector-emitter junction of said coupling transistors at diametrically opposite points on the ring circuit.

References Cited in the file of this patent

UNITED STATES PATENTS

| | | |
|---|---|---|
| 2,846,594 | Pankratz et al. | Aug. 5, 1958 |
| 2,861,201 | Cooke-Yarborough | Nov. 18, 1958 |
| 2,876,365 | Slusser | Mar. 3, 1959 |
| 2,882,423 | MacSorley | Apr. 14, 1959 |
| 2,899,572 | Skelton et al. | Aug. 11, 1959 |
| 2,933,622 | Clark | Apr. 19, 1960 |

UNITED STATES PATENT OFFICE

CERTIFICATE OF CORRECTION

Patent No. 2,988,654 June 13, 1961

Henry S. Katzenstein

It is hereby certified that error appears in the above numbered patent requiring correction and that the said Letters Patent should read as corrected below.

Column 3, line 34, for "which" read -- while --; line 37, for "band" read -- hand --; same column 3, line 66, for "8TR5" read -- TR5 --.

Signed and sealed this 6th day of February 1962.

(SEAL)
Attest:

ERNEST W. SWIDER
Attesting Officer

DAVID L. LADD
Commissioner of Patents